United States Patent
Hobson et al.

(10) Patent No.: US 6,592,083 B1
(45) Date of Patent: Jul. 15, 2003

(54) STUD WELDABLE CABLE MOUNT ASSEMBLY

(75) Inventors: Blake C. Hobson, Crystal Lake, IL (US); Jack A. Koepke, Kewanee, IL (US)

(73) Assignee: Image Industries, Inc., Wood Dale, IL (US)

(*) Notice: Subject to any disclaimer, the term of this patent is extended or adjusted under 35 U.S.C. 154(b) by 228 days.

(21) Appl. No.: 09/615,395

(22) Filed: Jul. 13, 2000

(51) Int. Cl.$^7$ ................................ F16L 3/12
(52) U.S. Cl. .................. 248/74.3; 248/74.1; 248/74.2; 248/68.1
(58) Field of Search .................. 248/74.1, 74.3, 248/73, 71, 69, 500, 505; 411/171, 180

(56) References Cited

U.S. PATENT DOCUMENTS

| | | | |
|---|---|---|---|
| 2,803,201 A | 8/1957 | Johnson et al. ............... 105/369 |
| 3,106,377 A | 10/1963 | Cotton ........................ 248/361 |
| 3,120,938 A | 2/1964 | Lucas ............................ 248/68 |
| 3,149,808 A | 9/1964 | Weckesser ..................... 248/74 |
| 3,463,427 A | * 8/1969 | Fisher ........................... 248/68 |
| 3,552,696 A | * 1/1971 | Orenick ........................ 248/68 |
| 3,632,069 A | 1/1972 | Thayer ......................... 248/68 |
| 3,632,070 A | * 1/1972 | Thayer ......................... 248/68 |
| 4,188,004 A | * 2/1980 | Fulton et al. ............ 248/74 PB |
| 4,347,999 A | 9/1982 | Sato et al. ..................... 248/73 |
| 4,431,352 A | 2/1984 | Andrews ....................... 410/101 |
| 4,447,934 A | * 5/1984 | Anscher ................... 24/16 PB |
| 4,570,987 A | 2/1986 | Wong et al. .................. 294/1.1 |
| 4,641,986 A | 2/1987 | Tsui et al. .................... 403/164 |
| 4,705,245 A | 11/1987 | Osada ........................ 248/74.3 |
| 4,708,306 A | 11/1987 | Mitomi ...................... 248/74.3 |
| 4,850,772 A | * 7/1989 | Jenkins ....................... 411/171 |
| 5,180,263 A | 1/1993 | Flowers ...................... 410/106 |
| 5,248,176 A | 9/1993 | Fredriksson ................. 294/1.1 |
| 5,326,055 A | 7/1994 | Page et al. .................. 248/74.3 |
| 5,332,179 A | 7/1994 | Kuffel et al. ............... 248/74.3 |
| 5,337,983 A | 8/1994 | Mailey ....................... 248/74.3 |
| 5,354,021 A | 10/1994 | Farrell ....................... 248/74.3 |
| 5,409,335 A | 4/1995 | Beck .......................... 410/105 |
| 5,505,411 A | 4/1996 | Heaton et al. ................. 248/70 |
| 5,511,288 A | 4/1996 | McAndrews et al. ........ 24/16 R |
| 5,564,672 A | 10/1996 | Matson ...................... 248/74.3 |
| 5,586,801 A | 12/1996 | Sawyer et al. ............... 294/1.1 |
| 5,661,876 A | * 9/1997 | Goldenberg .................... 24/19 |
| 5,699,232 A | * 12/1997 | Neidig et al. ................. 361/752 |
| 5,774,948 A | 7/1998 | Petschke et al. ............... 24/265 |
| 5,820,083 A | * 10/1998 | Geiger ....................... 248/74.3 |
| 5,967,720 A | 10/1999 | Profit ......................... 410/116 |
| 6,010,274 A | * 1/2000 | Abouzahr ................. 403/408.1 |
| 6,238,121 B1 | * 5/2001 | Roser ........................... 403/13 |

* cited by examiner

Primary Examiner—Leslie A. Braun
Assistant Examiner—Steven Marsh
(74) Attorney, Agent, or Firm—Donald E. Egan

(57) ABSTRACT

A cable mount assembly that comprises a weldable stud affixed to a cable mount adapted to engage a cable tie used to secure elongated objects to a substrate. The stud is generally cylindrical with an annular collar or rim spaced between the ends of the stud. The cable mount is affixed to the stud between the collar and the weldable end of the stud.

8 Claims, 2 Drawing Sheets

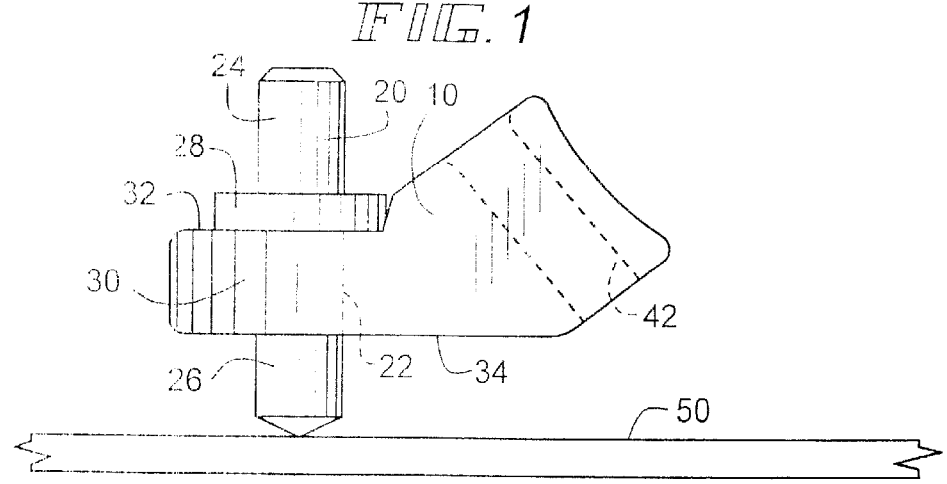
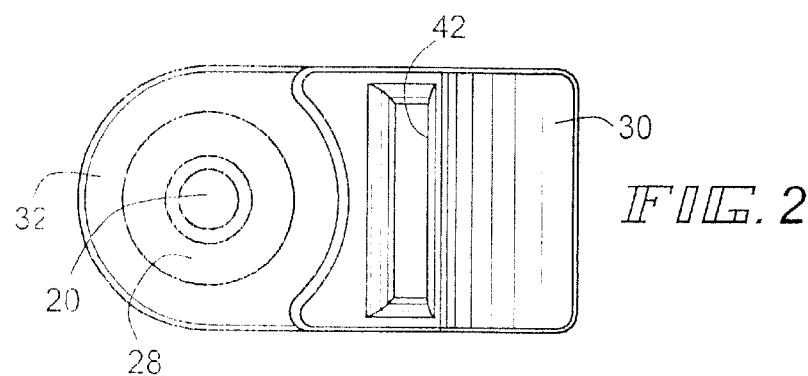
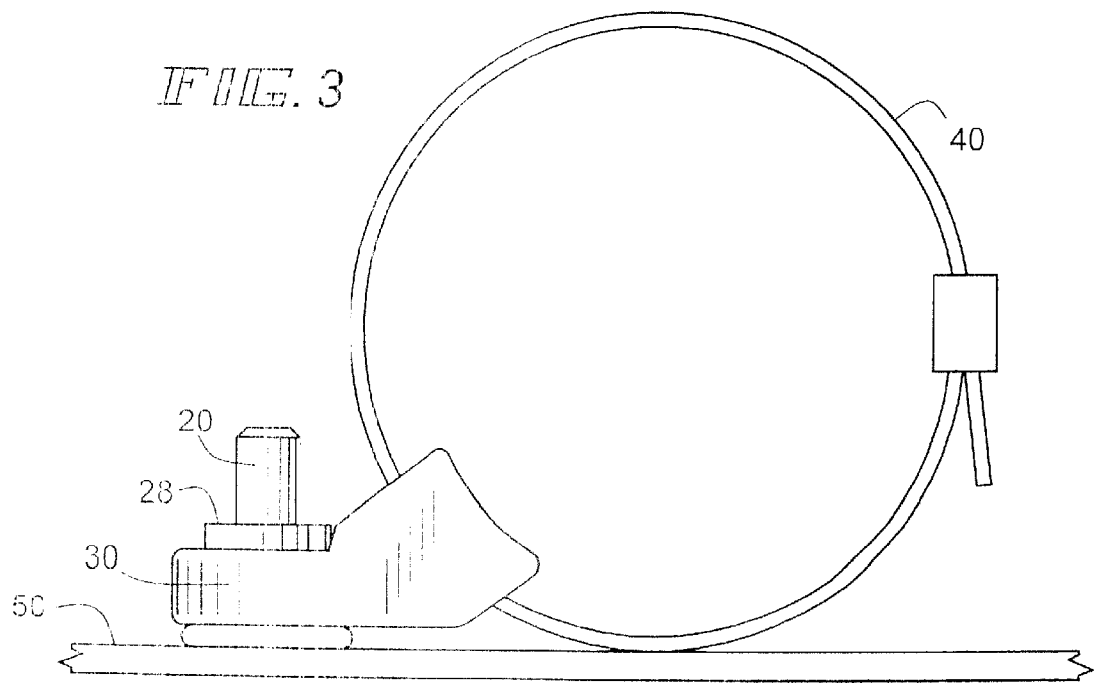

STUD WELDABLE CABLE MOUNT ASSEMBLY

FIELD OF INVENTION

The present invention relates to a cable mount assembly that comprises a weldable stud affixed to a cable mount adapted to engage a cable tie used to secure elongated objects to a substrate. The stud is generally cylindrical with an annular collar or rim spaced between the ends of the stud. The cable mount is affixed to the stud between the collar and the weldable end of the stud. The assembly is installed by arc welding the stud to a metal substrate using a stud-welding machine. After installation, the collar on the stud permanently locks the cable mount to the substrate. The elongated object is affixed to the assembly by engaging a conventional cable tie through an opening in the cable mount and around the elongated object. The cable tie is then locked to secure the elongated object in the desired position.

THE PRIOR ART

The prior art has proposed various systems to mount cable mounts for cable ties on substrates. In several prior art systems, a hole is drilled in the substrate and the cable mount is attached to the substrate using a bolt, washer and nut in sequence. See, for example, U.S. Pat. Nos. 4,431,352; 5,774,948 and 5,820,083. Such systems are very labor intensive because they involve 7 steps, namely:

1. Marking the substrate with the position of the cable mount;
2. Drilling the hole in the substrate;
3. Inserting a bolt in the hole;
4. Placing the cable mount on the bolt;
5. Placing a washer on the bolt;
6. Threading a nut on the bolt; and
7. Tightening the nut.

The prior art has also proposed cable mount-fastening systems that weld threaded studs to a substrate and the cable mounts are secured to the stud with a washer and nut. See, for example, U.S. Pat. No. 5,586,801. Such systems are also very labor intensive because they also involve 7 steps, namely:

1. Marking the substrate with the position of the cable mount;
2. Grinding the rust, dirt & paint from the substrate;
3. Welding the stud to the substrate;
4. Placing the cable mount on the stud;
5. Placing a washer on the stud;
6. Threading a nut on the stud; and
7. Tightening the nut.

Further, both of these prior art systems require the user to inventory at least 4 separate parts, namely a bolt or stud, a cable mount, a washer, and a nut. Still further, both of these systems can fail if the nut loosens on the bolt and the cable mount falls off the bolt or stud.

Accordingly, one feature of the present invention is to provide a unitary cable tie assembly that is readily welded to a metal substrate in a single operation.

Still another feature of the present invention is to provide a new and improved cable mount installation that permanently affixes the cable mount to the substrate.

SUMMARY OF INVENTION

The present invention relates to a cable mount assembly that comprises a weldable stud affixed to a cable mount adapted to engage a cable tie that is used to secure elongated objects to a substrate. The stud is generally cylindrical with an annular collar or rim spaced between the ends of the stud. The cable mount is affixed to the stud between the collar and the weldable end of the stud. The assembly is installed by arc welding the stud to a metal substrate using a stud-welding machine. After installation, the collar on the stud permanently locks the cable mount to the substrate. The elongated object is affixed to the assembly by inserting a cable tie through an opening in the cable mount and around the elongated object. The cable tie is then locked to secure the elongated object in the desired position.

In the preferred embodiment, the weldable end of the stud is pointed and the assembly is installed using a stud-welding machine that can tap or hammer the point of the stud against the substrate on which the stud is to be installed. It has been found that the tapping action using a pointed stud can break through any dirt, rust, corrosion and even paint to enhance the electrical contact between the stud and the substrate. The improved electrical contact between the stud and the substrate created by the tapping action allows a more dependable and uniform installation of the studs on the substrate.

In the preferred embodiment, cable mount has one flat surface that faces the substrate when the assembly is installed. The cable mount has an opening transverse to the flat surface. The stud extends through the transverse opening and the weldable end of the stud protrudes from the flat surface of the cable mount. The stud is frictionally held in the transverse opening of the cable mount, which is preferably made of nylon. Alternatively, the cable mount may be molded around the stud wherein the collar of the stud is locked into the cable mount. The cable mount has a second opening that allows insertion of a conventional cable tie that is used to secure the elongated object to the cable mount.

BRIEF DESCRIPTION OF THE DRAWINGS

Other objects and a fuller understanding of the invention may be had by referring to the following description and claims taken in conjunction with the accompany-hag draws in which:

FIG. 1 is a side view showing the cable tie assembly of the present invention before installation;

FIG. 2 is a view of the cable tie assembly of the present invention;

FIG. 3 is a view showing the cable tie assembly of the present invention after in ion;

DETAILED DESCRIPTION OF THE INVENTION

Figure 4:
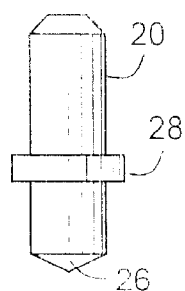
FIG. 4 a side view of the preferred embodiment of the stud for use in the cable tie assembly of the present invention.

The present invention relates to a cable mount assembly that comprises a weldable stud affixed to a cable mount adapted to engage a cable tie used to secure elongated objects to a substrate. The stud is generally cylindrical with an annular collar or rim spaced between the ends of the stud. The cable mount is affixed to the stud between the collar and the weldable end of the stud. The assembly is installed by arc welding the stud to a metal substrate using a stud-welding machine. After installation, the collar on the stud permanently locks the cable mount to the substrate, i.e. it cannot be disassembled. Elongated objects such as wires, pipes, pneumatic lines and the like may be affixed to the assembly by inserting a cable tie through the opening in the cable mount and around the elongated object. The cable tie may be locked to secure the elongated object in the desired position.

Having reference to FIG. 1, cable mount assembly 10 comprises stud 20 affixed cable mount 30. Assembly 10 is positioned adjacent to substrate 50. FIG. 3 illustrates cable mount assembly 10 after installation by welding stud 20 to substrate 50.

THE STUD

Stud 20 is generally cylindrical and includes central section 22 and ends 24 and 26. Annular collar 28 is positioned on central section 22. Stud 20 is fabricated from a material that is weldable to the substrate 50. For example, the stud may be fabricated of C1005 to C1018 steel, stainless steel or aluminum, depending upon the nature of the substrate. Central section 22 of stud 20 preferably has a diameter sized to fit snuggly in the transverse opening 32 of cable mount 30 and preferably stud 20 is frictionally affixed in cable mount 30.

End 24 of stud 20 is generally cylindrical and has an appropriate diameter and sufficient length allow end 24 to be grasped by a stud-welding machine. The diameter of end 24 can vary over wide limits, but a standard diameter adapted to the stud-welding machine is preferred. Generally the length of end 24 should be at least 0.250 inches and preferably is at least 0.375 inches.

End 26 of stud 20 must be weldable to substrate 50. End 26 may have the same diameter as end 24, although end 26 may have a larger or smaller diameter than end 24. Preferably end 26 is pointed to facilitate a tap installation process. A point having an included angle of about 120° is preferred.

Collar 28 of stud 20 is preferably integrally formed during the cold forming process that is used to fabricate the stud. Preferably collar 28 has an annular shape, although it may be a discontinuous annulus. Collar 28 functions to permanently lock cable mount 30 to substrate 50 after assembly 10 is installed.

THE CABLE MOUNT

The cable mount 30 used in the cable mount assembly of the present invention can vary widely in size, shape and composition. It is essential only that the cable mount have opening 36 to accommodate stud 20 and that the cable mount have sufficient space around end 24 of stud 20 to allow the stud welding machine to grasp end 24 of cable mount 20. In its broadest embodiment, stud 20 is oriented in opening 36 in such a way that a portion of cable mount 30 is between collar 28 of stud 20 and weldable end 26 of stud 20. Thus when cable mount assembly 10 is installed and weldable end 26 of stud 20 is welded to the substrate, collar 28 will lock cable mount 30 to substrate 50 and thereafter the assembly cannot be disassembled. It is also necessary that stud 20 be affixed to cable mount 30 so that assembly 10 may be packaged, transported, inventoried, handled and installed without stud 20 becoming separated from cable mount 30. The particular mechanism used to affix stud 20 to cable mount 30 is not critical, but it is necessary to employ an affixation mechanism that is essentially fail-safe.

The present invention is not limited to any particular form of cable mount. The preferred form of cable mount 30 is shown in the drawings, see FIGS. 1 through 12. U.S. Pat. No. 5,820,083 illustrates cable mounts that are suitable for use. The preferred form of cable mount includes two parallel surfaces 32 and 34 with stud engaging opening 36 extending from surface 32 to surface 34. Preferably cable mount 30 includes extension arm 38 in which cable tie opening 42 is positioned at a 45° angle to parallel surfaces 32 and 34. Cable tie 40, as shown in FIG. 3, is connected to cable mount 30 though opening 42.

The present invention is not limited to any particular form of cable tie. A wide variety of conventional cable ties may be used to secure the elongated objects to the cable mount. Generally, any mechanism could be used to secure elongated objects to the cable mount including conventional plastic or metal cable ties, ties that are integral to the cable mount and the like.

The two parallel surfaces 32 and 34 of the preferred cable mount shown in FIGS. 1 to 12 allow this embodiment of cable mount to be stacked so that a plurality of cable mounts can be fitted on one stud having an elongated central section. This allows in installation of multiple cable mounts in a single installation operation.

In the preferred embodiment cable mount 30 is fabricated from nylon or some other plastic material having a melting point high enough to resist melting during the stud welding installation process. Alternatively, the cable mount may be fabricated from metal or other materials that withstand the head of the stud welding installation process.

Figure 5:
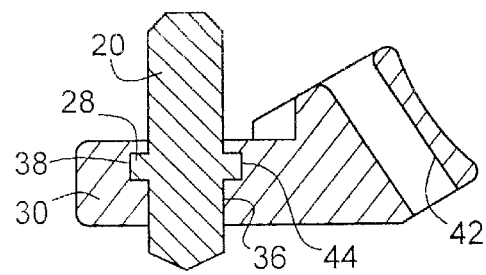
FIG. 5 is a sectional side view of the cable tie assembly of the present invention showing the stud of FIG. 4 affixed to the cable mount.

FIGS. 4 and 5 illustrate one embodiment of affixing stud 20 to cable mount 30 in which the collar 28 of stud 20 fits in an annular slot 44 of cable mount 30. The embodiment shown in FIGS. 4 and 5 may be manufactured by molding cable mount 30 with stud 20 in place.

Figure 6:
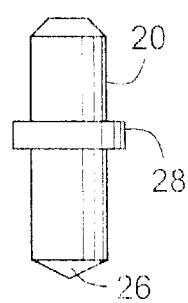
FIG. 6 is a side view of second embodiment of the stud for use in the cable tie assembly present invention.
Figure 7:
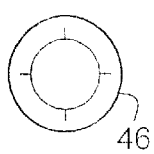
FIG. 7 is a top view of a retention clip used to engage the stud of FIG. 6.
Figure 8:
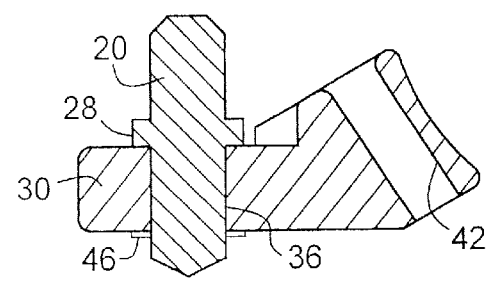
FIG. 8 is a sectional side view of the cable tie assembly of the present invention showing the stud of FIG. 6 affixed to the cable mount.

FIGS. 6, 7 and 8 illustrate another embodiment of affixing stud 20 to cable mount 30 in which a retention clip 46 is positioned on end 26 of stud 20 to lock stud 20 in opening 36. In the embodiment shown in FIG. 8, cable mount 30 is affixed to stud 20 between collar 28 and retention clip 46.

Figure 9:
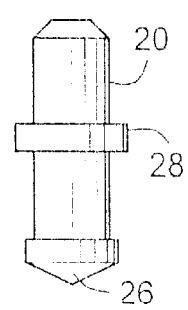
FIG. 9 is a side view of a third embodiment of the stud for use in the cable tie assembly of the present invention.
Figure 10:
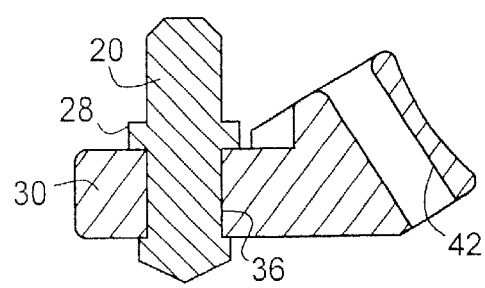
FIG. 10 is a sectional side view of the cable tie assembly of the present invention showing the stud of FIG. 9 affixed to the cable mount.

FIGS. 9 and 10 illustrate another embodiment of affixing stud 20 to cable mount 30 in which end 26 of stud 20 press fit into opening 36 of cable mount 30. In this embodiment, collar 28 and end 26 of stud 20 have a larger diameter than central section 22 of stud 20. The enlarged diameter of end 26 affixes stud 20 to cable mount 30 so that the assembly can be handled without separation of stud 20 from cable mount 30.

Figure 11:
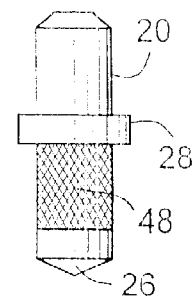
FIG. 11 is a side view of a fourth embodiment of the stud for use in the cable tie assembly of the present invention.
Figure 12:
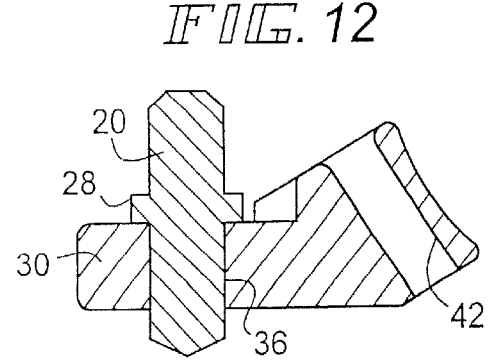
FIG. 12 is a sectional side view of the cable tie assembly of the present invention showing the stud of FIG. 11 affixed to the cable mount.

In the preferred embodiment, the stud is frictionally held in the transverse opening of the cable mount. FIGS. 11 and 12 illustrate such an embodiment of affixing stud 20 to cable mount 30 in which central section 22 of stud 20 is knurled, as indicated by reference numeral 48, to provide an enhanced frictional affixation of stud 20 in opening 36 of cable mount 30.

The present invention contemplates the affixation of the stud in the cable mount in a manner that allows the cable mount to be pivoted around the stud after the assembly has been installed in order to adjust the orientation of the cable mount to the desired angle. The stud retention systems shown in FIGS. 4 to 10 are best adapted to this feature.

The forms of invention shown and described herein are to be considered only as illustrative. It will be apparent to those skilled in the art that numerous modifications may be made therein without departing from the spirit of the invention and the scope of the appended claims.

We claim:

1. A cable mount assembly comprising a weldable stud affixed to a cable mount, said stud having two ends, said first end being generally cylindrical and having sufficient length to be grasped by a stud welding machine, said second end being weldable, said stud having a collar positioned between said ends;

said cable mount having two surfaces and a transverse opening between said surfaces, said opening sized to receive said stud, said stud positioned in said transverse opening with said weldable end protruding from a first surface of said cable mount and said collar being separated from said first surface by a portion of said cable mount.

2. The cable mount assembly as described in claim 1, wherein said collar is annular.

3. The cable mount assembly as described in claim 1, wherein said collar is integrally formed on said stud.

4. The cable mount assembly as described in claim 1, wherein said stud is positioned in said transverse opening with said weldable end protruding from said first surface of said cable mount and said collar is disposed adjacent to the opposite surface of said cable mount.

5. The cable mount assembly as described in claim 1, wherein said stud is frictionally affixed in said cable mount.

6. The cable mount assembly as described in claim 1, wherein said collar is disposed in a slot within said cable mount.

7. The cable mount assembly as described in claim 6, wherein said cable mount includes an annular slot in said transverse opening, said annular slot being of sufficient size to receive said stud collar, said stud being positioned in said transverse opening with said collar extending into said annular slot to mechanically lock said stud in said cable mount.

8. The cable mount assembly as described in claim 1, wherein said weldable end of said stud is pointed.

* * * * *